(12) United States Patent
Allen et al.

(10) Patent No.: US 7,334,141 B2
(45) Date of Patent: Feb. 19, 2008

(54) METHOD OF SAVING ENERGY IN AN INFORMATION HANDLING SYSTEM BY CONTROLLING A MAIN CONVERTER BASED ON THE AMOUNT OF POWER DRAWN BY THE SYSTEM

(75) Inventors: Robert Allen, Cedar Park, TX (US); Dan E. Jenkins, Bastrop, TX (US)

(73) Assignee: Dell Products L.P., Round Rock, TX (US)

( * ) Notice: Subject to any disclaimer, the term of this patent is extended or adjusted under 35 U.S.C. 154(b) by 287 days.

(21) Appl. No.: 10/421,496

(22) Filed: Apr. 23, 2003

(65) Prior Publication Data
US 2004/0215990 A1    Oct. 28, 2004

(51) Int. Cl.
*G06F 1/26* (2006.01)
(52) U.S. Cl. ............... 713/320; 713/300; 713/324; 363/59
(58) Field of Classification Search ......... 713/300, 713/320, 324, 330; 363/59
See application file for complete search history.

(56) References Cited

U.S. PATENT DOCUMENTS

| | | | | |
|---|---|---|---|---|
| 3,805,142 A | * | 4/1974 | Rando | 363/53 |
| 4,138,715 A | * | 2/1979 | Miller | 363/28 |
| 4,155,112 A | * | 5/1979 | Miller et al. | 323/222 |
| 4,409,665 A | * | 10/1983 | Tubbs | 713/321 |
| 4,812,847 A | | 3/1989 | Stewart et al. | 341/154 |
| 5,659,465 A | * | 8/1997 | Flack et al. | 363/71 |
| 5,719,450 A | | 2/1998 | Vora | 307/116 |
| 5,855,064 A | | 1/1999 | Chang | 29/861 |
| 6,000,042 A | | 12/1999 | Henrie | 714/40 |
| 6,178,514 B1 | | 1/2001 | Wood | 713/300 |

(Continued)

OTHER PUBLICATIONS

U.S. Appl. No. 10/373,397 titled "Soft Power-Up for an External Power Adapter", Feb. 24, 2003.

*Primary Examiner*—Thomas Lee
*Assistant Examiner*—Malcolm D Cribbs
(74) *Attorney, Agent, or Firm*—Baker Botts L.L.P.

(57) ABSTRACT

An information handling system having an energy saving power converter that comprises a main converter for supplying power to the information handling system when in active operation, and an auxiliary converter for supplying standby power to the information handling system when in a sleep or shutdown mode of operation. The main converter is designed to supply the maximum amount of power required by the information handling system, and the auxiliary converter is designed to supply only enough power to maintain the information handling system in the sleep or shutdown mode of operation. The main converter goes into a standby or shutdown condition when not supplying power to the information handling system. The auxiliary converter is designed to draw a minimum amount of energy, only enough to maintain the information handling system in the standby or shutdown mode of operation. A voltage or current sensing logic is used to determine when the main converter should be active and when it should be in standby. A capacitor in the power converter stores enough energy so that the information handling system does not experience transients when the main converter goes back and forth between the active and standby conditions. Power blocking diodes may be used to prevent reverse power flow between the main converter and the auxiliary converter. A plurality of converters may be used for minimum standby power and maximum power conversion efficiency.

14 Claims, 8 Drawing Sheets

U.S. PATENT DOCUMENTS

| | | | |
|---|---|---|---|
| 6,210,036 B1 | 4/2001 | Eberle et al. | 374/141 |
| 6,314,001 B1 | 11/2001 | Chu | 361/826 |
| 6,333,668 B1 | 12/2001 | Takashima | 327/538 |
| 6,407,959 B2 | 6/2002 | Ishikawa et al. | 365/226 |
| 6,459,175 B1 | 10/2002 | Potega | 307/149 |
| 6,486,730 B1* | 11/2002 | Green | 327/541 |
| 6,903,583 B1* | 6/2005 | Habib et al. | 327/143 |
| 2002/0090026 A1* | 7/2002 | Ashley | 375/219 |
| 2003/0009702 A1* | 1/2003 | Park | 713/300 |
| 2003/0093702 A1* | 5/2003 | Luo et al. | 713/320 |
| 2003/0231516 A1* | 12/2003 | Farrar et al. | 363/65 |
| 2004/0196251 A1* | 10/2004 | Park | 345/102 |
| 2006/0071804 A1* | 4/2006 | Yoshioka | 340/636.1 |

\* cited by examiner

METHOD OF SAVING ENERGY IN AN INFORMATION HANDLING SYSTEM BY CONTROLLING A MAIN CONVERTER BASED ON THE AMOUNT OF POWER DRAWN BY THE SYSTEM

BACKGROUND OF THE INVENTION TECHNOLOGY

1. Field of the Invention

The present invention is related to information handling systems, and more specifically, to external power adapters for the information handling systems.

2. Background of the Related Technology

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Use of information handling systems in the office and at home have become ubiquitous and are rapidly becoming transparent to users of these information handling systems. More and more information handling systems are being deployed, and the capabilities and sophistication of these information systems have greatly increased in the last few years. With increased numbers, capabilities and sophistication, the electrical power required by these information systems has significantly increased. However, the full capabilities of the information handling systems may only be utilized a very small percentage of the total time that the systems are energized.

There is a long felt need in the information handling system technologies, e.g., computer industry, to have systems that consume one watt or less of power when they are in a standby or shutdown state. This is especially important to government entities and companies having large numbers of these systems, e.g., Department of Energy (DOE) Federal Energy Management Program (FEMP). Newer information handling systems have added hardware and firmware that allow turn off of various subsystems, e.g., onboard network interface controller (NIC) when going into a standby or shutdown state. Much of the future purchasing of new equipment quotations will favor low standby power consumption equipment.

New power saving technologies are being implemented in the latest information handling systems, e.g., instantly available personal computers (IAPCs). The Advanced Configuration and Power Interface (ACPI) specification provides a platform-independent, industry-standard approach to operating-system-based power management. The ACPI specification is a key constituent in Operating System Directed Power Management (OSPM). OSPM and ACPI may apply to all classes of information handling systems, e.g., computers, including handheld, notebook, desktop, servers, etc.

Many of these information handling systems use external power adapters, e.g., an external single output power converter, to reduce size, weight, cost and heat generation, and to add more flexibility in adapting to different voltages and electric receptacle configurations in various countries throughout the world.

There is a need for the single output power converter, e.g., having a 150 watt capacity, convection cooled, enclosed in a plastic box (e.g., dimensions of about 170×85×40 mm), and meeting the FEMP standards. However, in a single output power converter, rated for 150 watts of output power, it is difficult to have low enough overhead power consumption during light loading conditions and meet thermal requirements under full load conditions. The power consumption during minimum load conditions needs to comply with the FEMP, e.g., having a standby power draw of one watt or less. Current cost effective single output power supply topologies have difficulty minimizing the FEMP mandated low operating power requirements and still be able to meet all thermal dissipation requirements under full load conditions when using only convection cooling and being enclosed in a plastic box having, for example, the aforementioned dimensions.

On multiple output power supplies, the FEMP requirements have been addressed by having a separate standby power converter normally referred as the +5V standby or flee power. In the case of a single output supply, low-power control circuitry has been used. As the output power increases the minimum operating power required has increased to the point that exceeds the FEMP one watt limit.

Therefore, a problem exists, and a solution is required so as to meet energy saving standby requirements in an external power converter without exceeding power dissipation capabilities of the power converter components.

SUMMARY OF THE INVENTION

The present invention remedies the shortcomings of the present technologies by providing a power converter that does not suffer from the aforementioned shortcomings of the existing power saving technologies.

According to exemplary embodiments of the present invention, a power converter comprises a main converter for supplying power to the information handling system when in active operation, and an auxiliary converter for supplying standby power to the information handling system when in a sleep or shutdown mode of operation. The main converter is designed to supply the maximum amount of power required by the information handling system, and the auxiliary converter is designed to supply only enough power to maintain the information handling system in the sleep or shutdown mode of operation. The main converter is put into standby or shutdown when not supplying power to the information handling system. The auxiliary converter is designed to draw a minimum amount of energy, only enough to maintain the information handling system in the standby or shutdown mode of operation. A voltage or current sensing logic is used to determine when the main converter should be active and when it should be in standby. A capacitor in the power converter stores enough energy so that the information handling system does not experience transients when the main converter goes back and forth between the active and standby conditions. Power blocking diodes may be used to prevent reverse power flow between the main converter and the auxiliary converter.

A technical advantage of the present invention is reducing standby power in an information handling system to a minimum. Another technical advantage is adequate power dissipation in the power converter when maximum power is required. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of exemplary embodiments of the present invention are schematically illustrated. Like elements in the drawings will be represented by like numbers, and similar elements will be represented by like numbers with a different lower case letter suffix.

Figure 1:
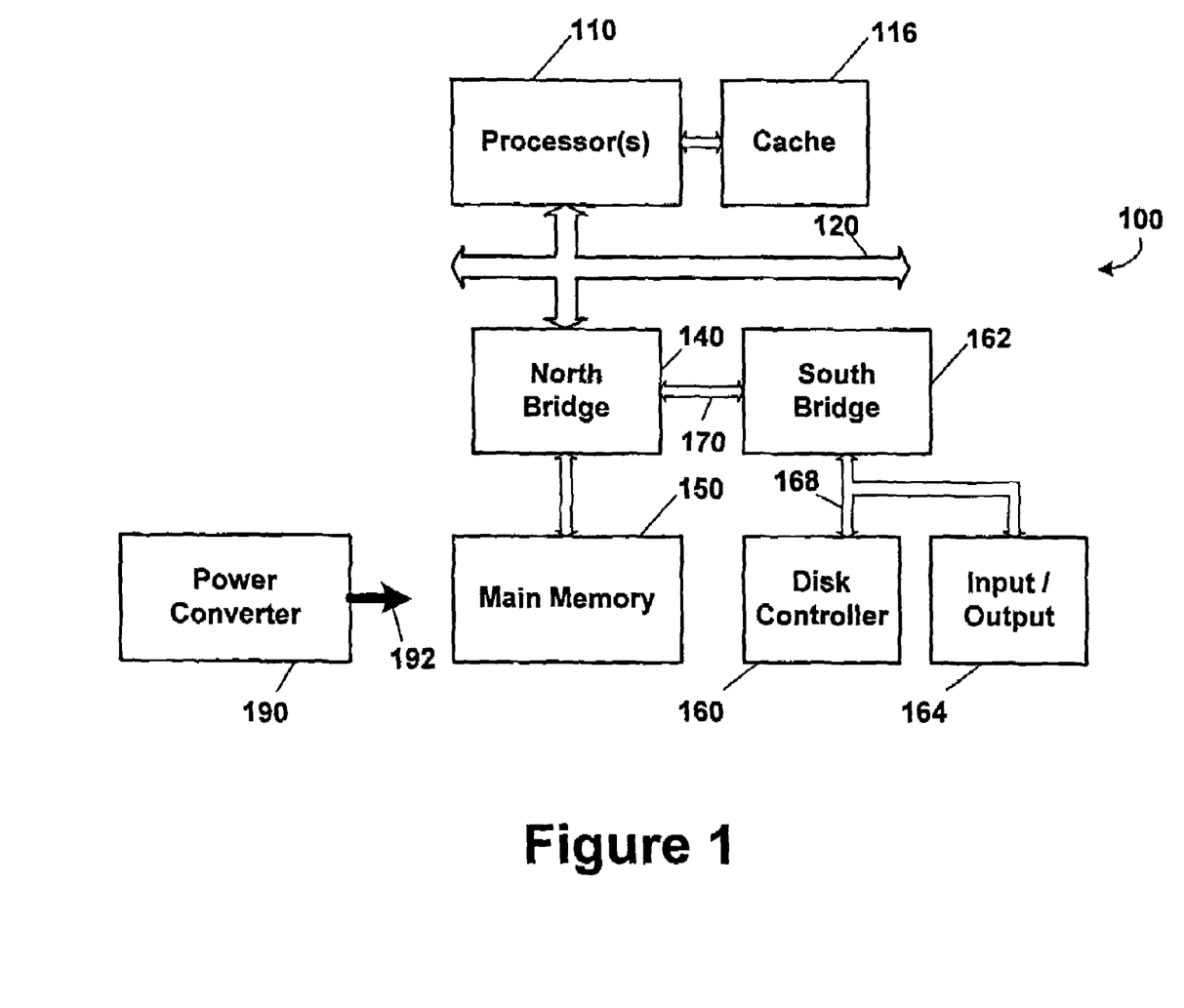
FIG. 1 is a schematic block diagram of an exemplary embodiment of an information handling system and an exemplary embodiment of the present invention.

Referring to FIG. 1, an information handling system is illustrated having electronic components mounted on at least one printed circuit board (PCB) (motherboard) and communicating data and control signals therebetween over signal buses. In one embodiment, the information handling system is a computer system. The information handling system, generally referenced by the numeral 100, comprises at least one processor 110 coupled to a host bus 120 and a cache memory 116. A north bridge 140, which may also be referred to as a memory controller hub or a memory controller, is coupled to a main system memory 150. The north bridge 140 is coupled to the system processor(s) 110 via the host bus 120. The north bridge 140 may be generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170, AGP bus coupled to graphics display (not shown), etc. A second bus(es) 168 may also comprise other industry standard buses or proprietary buses, e.g., ISA, SCSI, USB buses through a south bridge(s) (bus interface) 162. These secondary buses 168 may have their own interfaces and controllers, e.g., ATA disk controller 160 and input/output interface(s) 164, and interface with a disk controller, a network interface card, a graphics controller, a hard disk and the like.

In the information handling system 100, according to the present invention, an external power converter 190 is coupled to and powers the information handling system 100. Power is supplied to the information handling system 100 through a power bus 192 having a connector (not shown) adapted to couple with a mating power connector on the information handling system 100.

Figure 2:
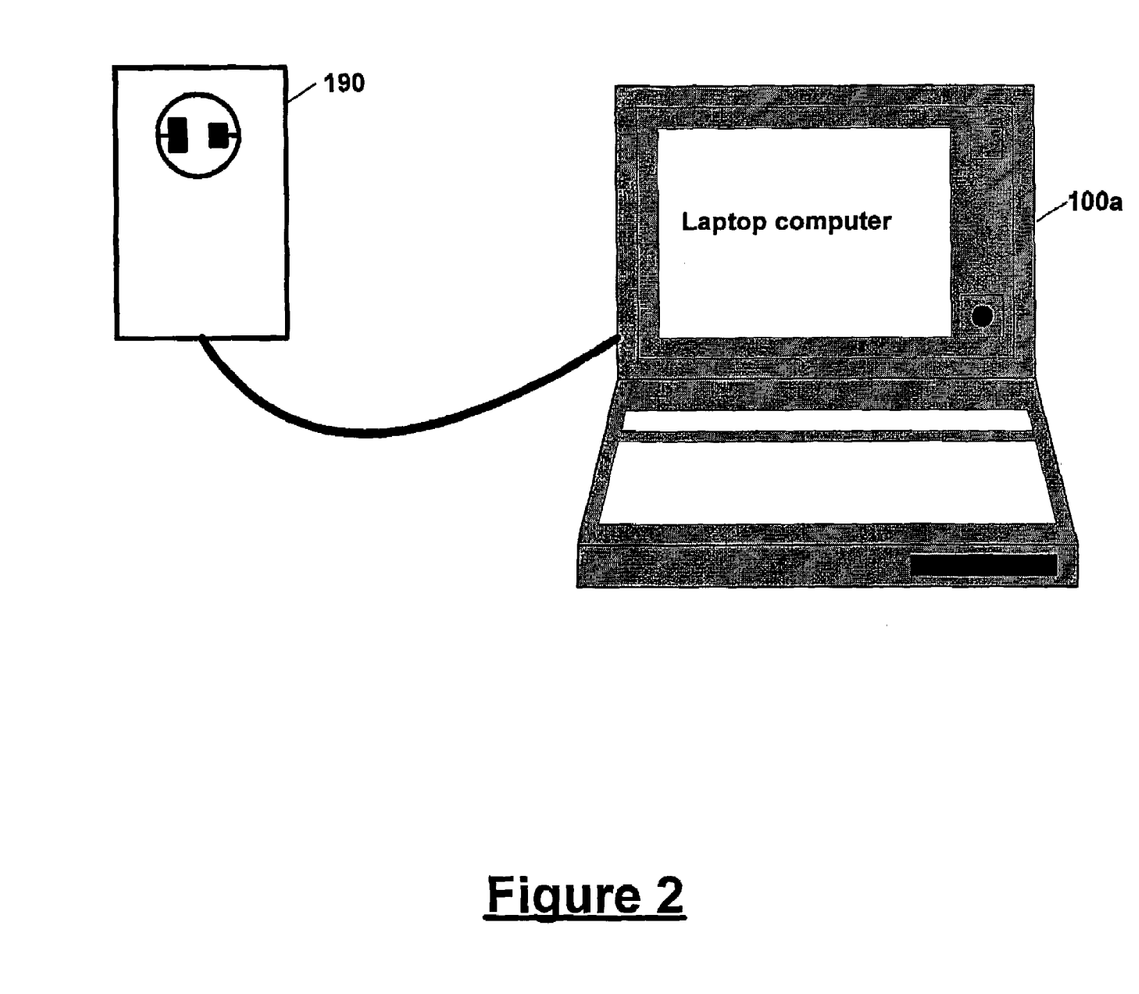
FIG. 2 is a schematic diagram of a portable computer representing the equipment depicted in FIG. 1.

Referring to FIG. 2, depicted is an exemplary embodiment of an information handling system 100, e.g., a laptop computer 100a, and the external power converter 190, according to the present invention. The external power converter 190 is configured to plug into an electrical outlet (not shown) and has a power cable with a power connector configured to plug into the laptop computer 100a.

Figure 3:
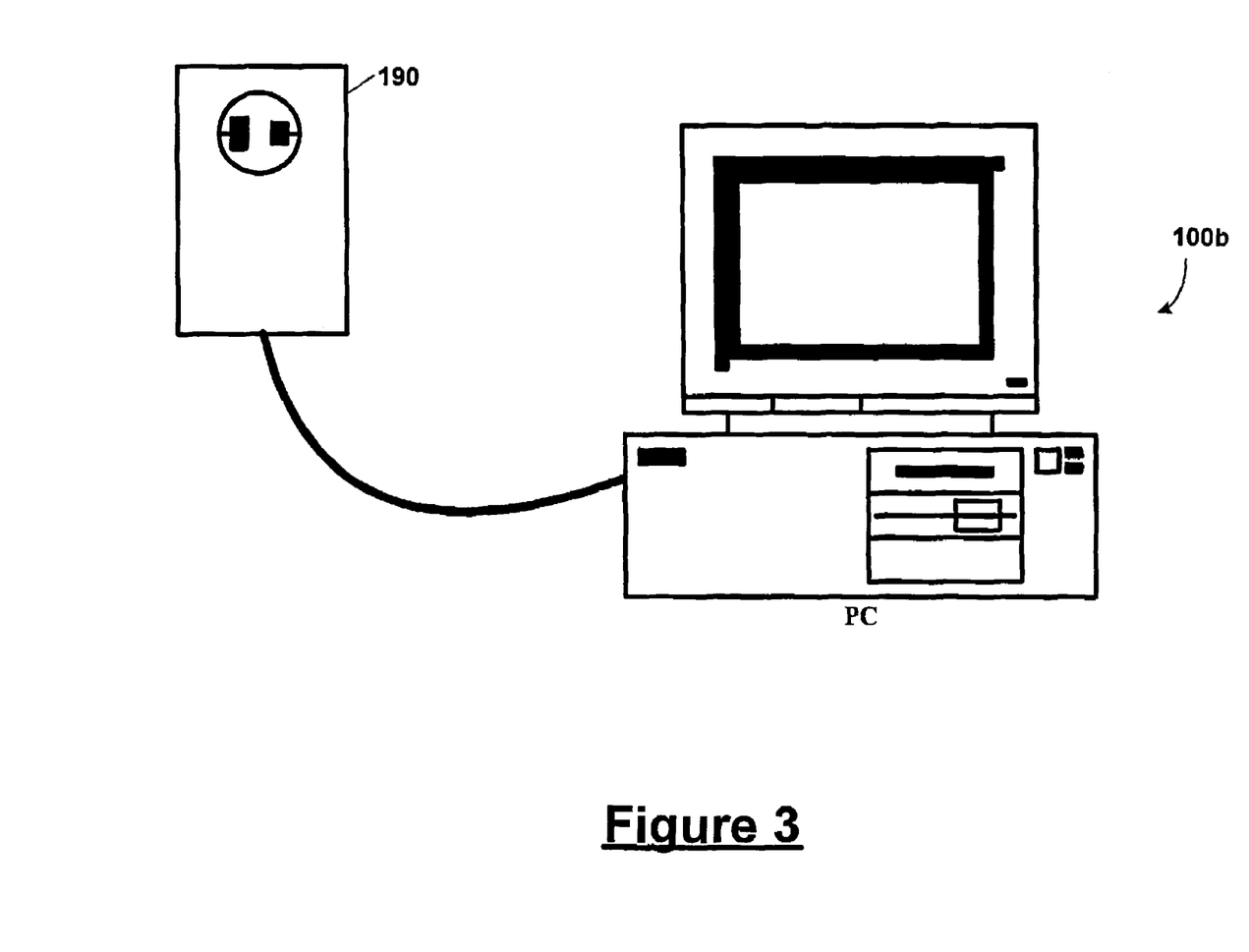
FIG. 3 is a schematic block diagram of a desk personal computer representing the equipment depicted in FIG. 1.

Referring to FIG. 3, depicted is an exemplary embodiment of an information handling system 100, e.g., a personal computer 100b, and the external power converter 190, according to the present invention. The external power converter 190 is configured to plug into an electrical outlet (not shown) and has a power cable with a power connector configured to plug into the personal computer 100b.

Figure 4:
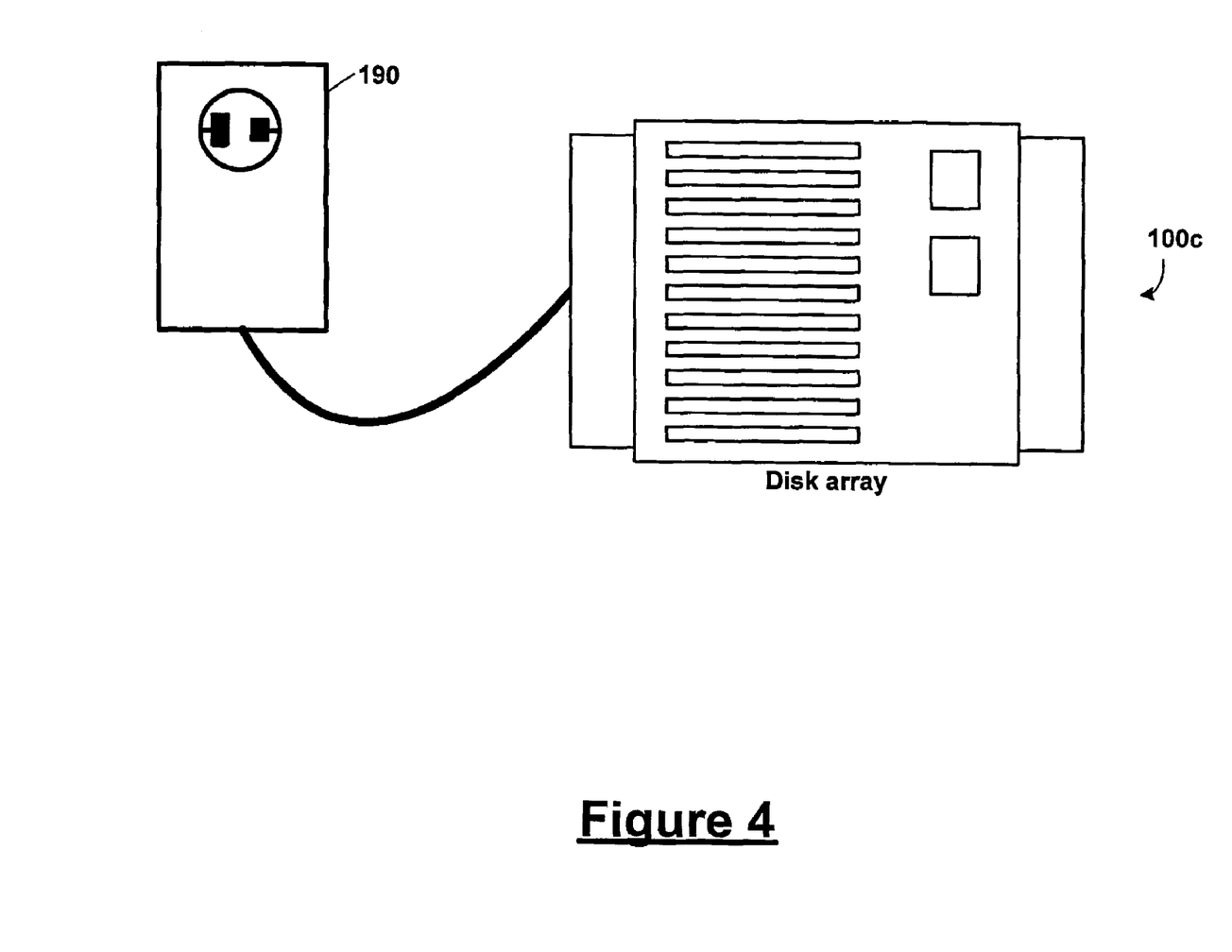
FIG. 4 is a schematic block diagram of a disk array representing the equipment depicted in FIG. 1.

Referring to FIG. 4, depicted is an exemplary embodiment of an information handling system 100, e.g., a disk array 100c, and the external power converter 190, according to the present invention. The external power converter 190 is configured to plug into an electrical outlet (not shown) and has a power cable with a power connector configured to plug into the information handling system 100. The information handling system 100 may also comprise, but not limited to, a printer, a router, a communications hub, a switch, a bridge, a digital telephone controller (e.g., PBX/PABX), an answering machine, a modem, a tape drive, a scanner, a telephone, a facsimile machine, a plotter, an external removable storage drive (e.g., zip drive, CD-ROM, DVD, floppy, etc.) and the like.

Figure 5:
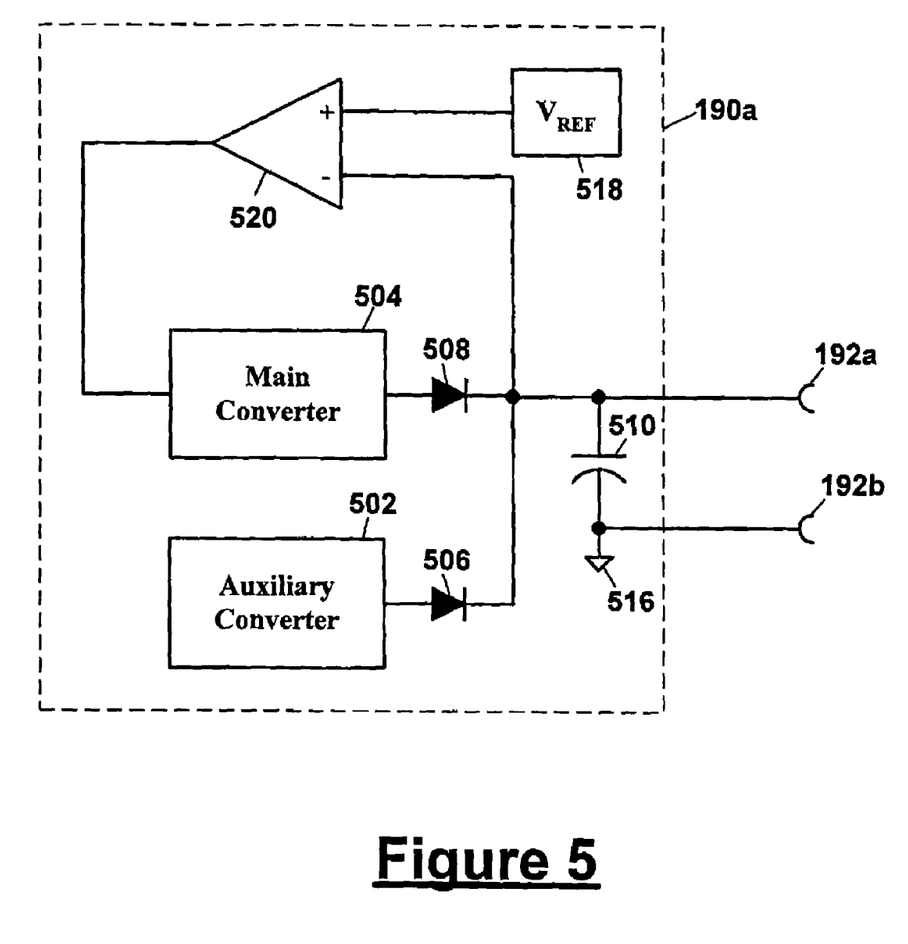
FIG. 5 is a schematic block diagram of an exemplary embodiment of the present invention.
Figure 7:
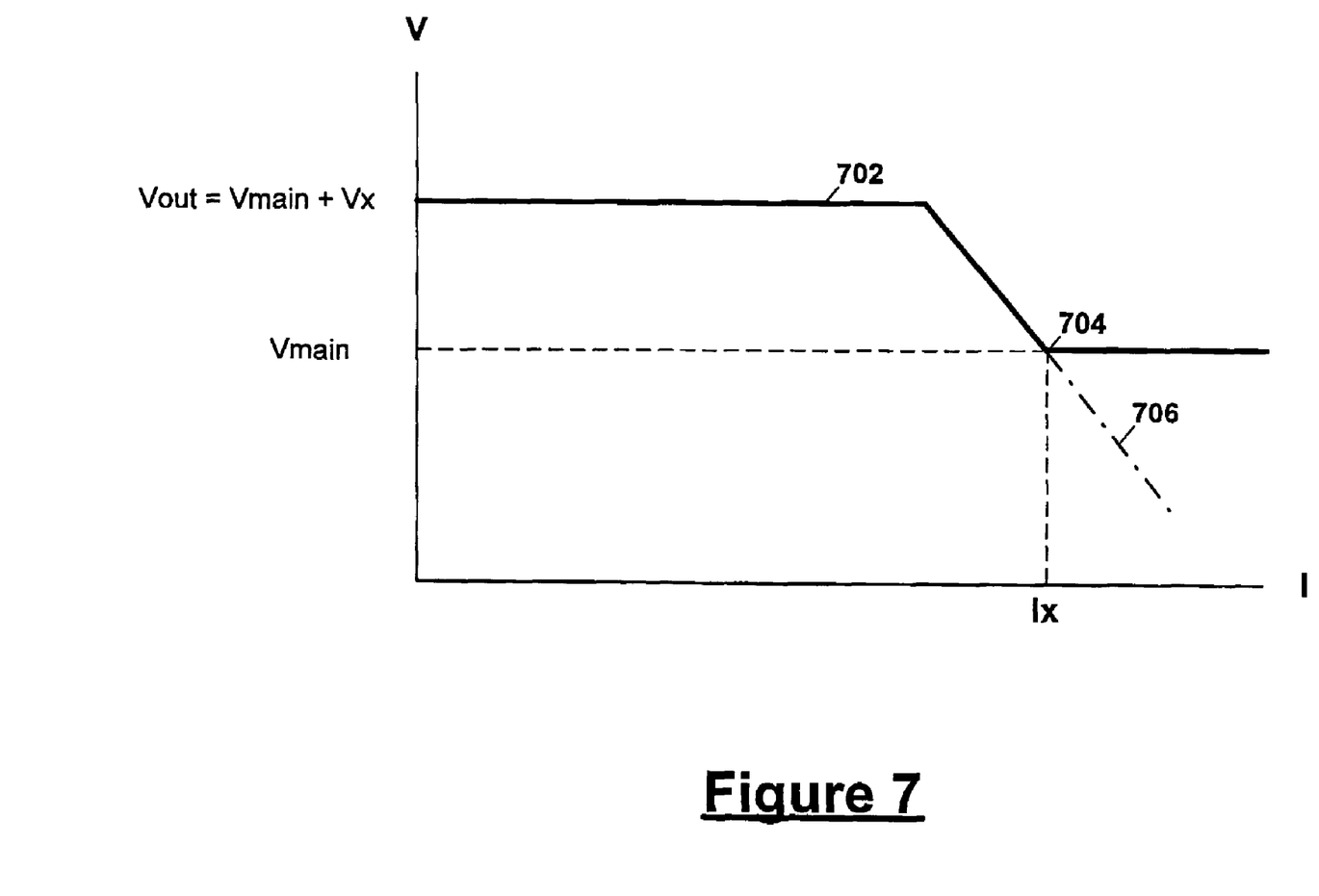
FIG. 7 is a voltage-current graph of the operation of the exemplary embodiments of the present invention.

Referring to FIG. 5, depicted is a schematic block diagram of an exemplary embodiment of the present invention. The power converter 109a comprises a main power converter 504, an auxiliary power converter 502, a comparator 520, a voltage reference 518, a capacitor 510, power blocking diodes 506 and 508, and power connector contacts 192a and 192b. The auxiliary converter 502 is set to have an output voltage slightly higher than the main converter output voltage, with this slightly higher voltage being current limited. Referring to FIG. 7, an exemplary output voltage—current graph of the auxiliary converter 502 is illustrated. When a low current is drawn by the information handling system 100, e.g., below current "Ix" of the depicted graph, the auxiliary converter 502 maintains Vout=Vmain+Vx, where Vmain is the voltage to which the main converter 504 is set, and Vx is the incremental voltage that the auxiliary converter 502 is above the main converter 504 when a minimal amount of current is drawn by the information handling system 100. When current drawn by the information handling system is, for example, greater than Ix, then the main converter 504 supplies the majority of current to the information handling system. Since the output voltage of the auxiliary converter 502 is current limited, it cannot maintain a higher voltage than the voltage of the main converter 504 when the current draw is greater than Ix.

When current draw is less than Ix, the auxiliary converter 502 supplies all power to the information handling system 100 (e.g., in a standby, sleep or shutdown state). The voltage reference 518 is set to a voltage value below Vmain+Vx, and above Vmain. Thus, the comparator 520 output will be at a first logic level when the voltage at the junction of the blocking diodes 506 and 508, and the capacitor 510 is greater than the voltage reference 518, Vref. Conversely, the comparator 520 output will be at a second logic level when the voltage at the junction of the blocking diodes 506 and 508, and the capacitor 510 is less than or equal to the voltage reference 518, Vref.

The voltage comparator 520 output may be used to control operation of the main converter 504. When the output of the voltage comparator 520 is at the first logic level, the main converter 504 may be in a standby or no current draw state, and when the output of the voltage comparator 520 is at the second logic level, the main converter 504 is fully operational and supplying power to the information handling system 100. Since the auxiliary converter 502 can only supply certain voltages up to a limited current value, its output voltage will become equal to the main converter 504 output voltage (see FIG. 7). Thus, when the information handling system is in an operational state and drawing normal operating power, the main converter 504 will supply substantially most of the required power. When the information handling system 100 is in the sleep or shutdown states, then the auxiliary converter 502 is able to supply any power required when these states. Power output from the main converter 504 is not required and, according to the present invention, goes into standby or shuts down so as not to draw excess power. The combination and operation of these two converters 502 and 504, described herein enables the information handling system to meet government low power consumption guidelines while having the capacity when necessary for producing much higher power outputs without compromising on component ratings and circuit design. The diodes 506 and 508 may be used to prevent reverse current from flowing from one converter to the other. The capacitor 510 is of sufficient capacitance so that any voltage transitions between the auxiliary converter 502 and the main converter 504 will not appear as voltage dips or spikes to the information handling system 100.

Figure 6:
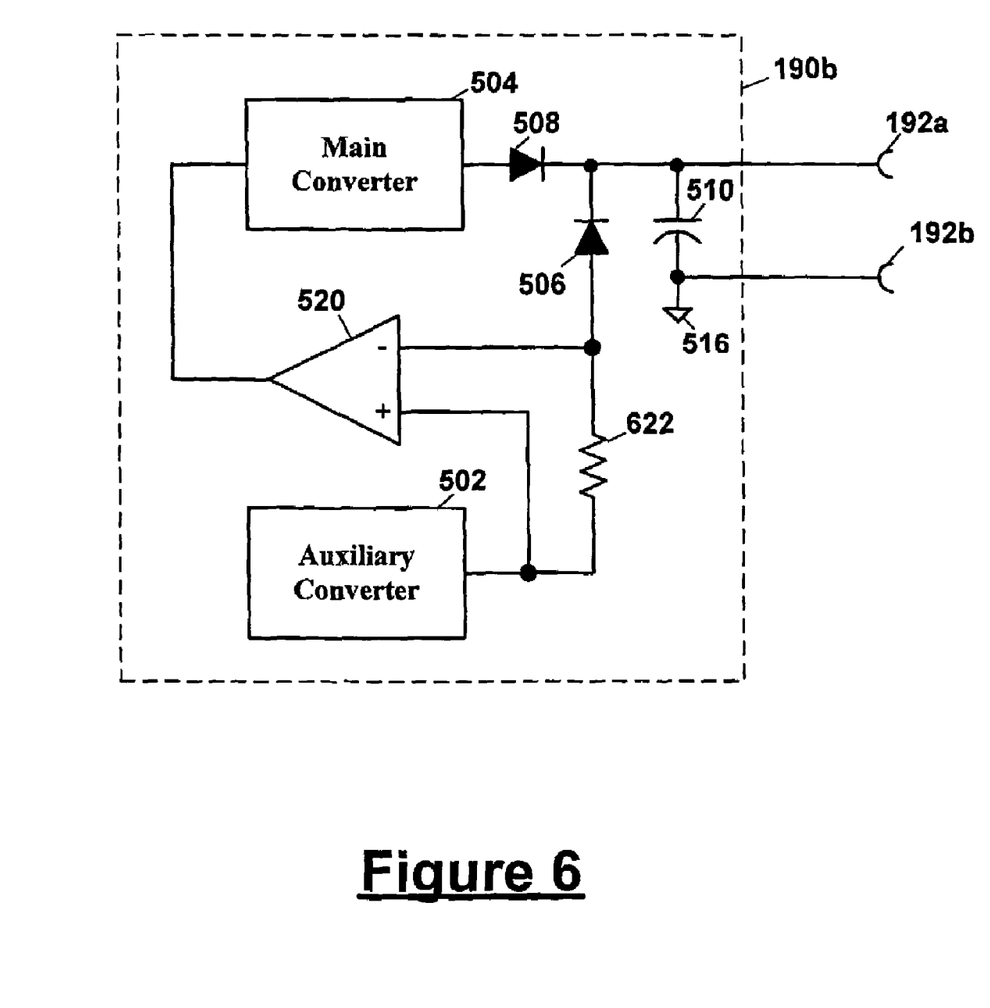
FIG. 6 is a schematic block diagram of another exemplary embodiment of the present invention.

Referring to FIG. 6, depicted is a schematic block diagram of another exemplary embodiment of the present invention. A resistor 622 may be used to measure the amount of current drawn from the auxiliary converter 502. Current through the resistor 622 produces a voltage proportional to this current (Ohm' Law). The comparator 520 monitors the voltage across the resistor 622, i.e., how much current is being drawn from the auxiliary converter 502. The voltage reference 518 is not needed in this embodiment of the invention. Using the example of FIG. 5, when a voltage proportional to less than or equal to Ix is measured across the differential inputs of the comparator 520, the output of the comparator 520 will be at the first logic level and the main converter 504 may be in a standby or no current draw state. When a voltage proportional to greater than Ix is measured across the differential inputs of the comparator 520, then the output of the voltage comparator 520 is at the second logic level and the main converter 504 is fully operational and supplying power to the information handling system 100. Operation of the auxiliary converter 502 and main converter 504 are as described hereinabove.

Figure 8:
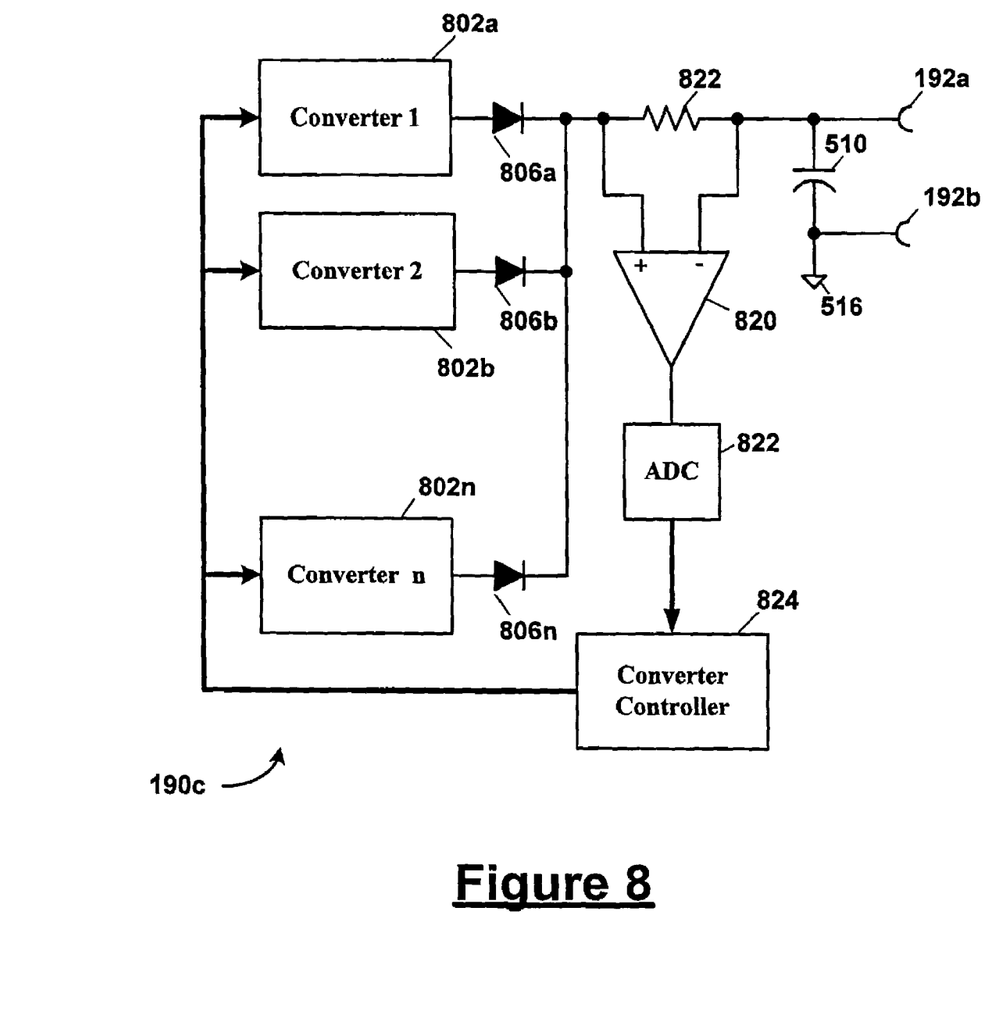
FIG. 8 is a schematic block diagram of still another exemplary embodiment of the present invention.

Referring to FIG. 8, depicted is a schematic block diagram of still another exemplary embodiment of the present invention. The power converter 190c comprises a plurality of converters 802a, 802b . . . , 802n; having a common output node through blocking diodes 806a, 806b . . . , 806n. A resistor 822 may be used to measure the amount of current drawn from the plurality of converters 802. Current through the resistor 822 produces a voltage proportional to this current (Ohm' Law). A differential input operational amplifier 820 is coupled to an analog-to-digital converter (ADC) which converts how much current is being drawn into a digital format for input to a converter controller 824 (a differential input ADC may be used without requiring an operational amplifier, however, the sensitivity and full scale range of the ADC may increase with the operational amplifier). The converter controller 824 selects the converter(s) 802 appropriate for the current being drawn by the information handling system 100. The converters 802 may be designed to be most efficient over a certain range of currents. By selecting the most appropriate converter(s) 802, minimum standby current and maximum operational efficiency are achieved. In addition, if any one of the converts 802 fails, the over working converters 802 may still be able to power the information handling system. Redundancy and high availability of the power converter 190c may be improved by monitoring the voltage output using an analog multiplexer in combination with the ADC 824 or a second ADC (not shown). Thus if the output voltage "droops" below a desired value, then another converter(s) 802 can be enabled by the converter controller 824 until the desired output voltage is obtained.

It is contemplated and within the scope of the invention that a plurality of converters having different output current capacities may be combined together as described hereinabove. Each of the plurality of converters may be optimized for most efficient operation at different current values, e.g., binary weighted, and may be combined by switching the appropriate ones of the plurality of converters so as to maximize the power converter 190 efficiency for all load conditions. In addition, redundancy in the power converter 190 may be achieved with the plurality of converters.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having an energy saving power converter, said system comprising:
    information handling equipment;
    a power converter adapted for supplying power to the information handling equipment, wherein said power converter comprises
        a main converter;
        an auxiliary converter, wherein the main converter and the auxiliary converter have outputs coupled together with blocking diodes; and
        a circuit for enabling and disabling said main converter depending upon said information handling equipment power requirement, wherein the circuit determines whether an output voltage level of the power converter is greater than, equal to, or less than a voltage value, wherein when the main converter is enabled if the output voltage level of the power converter is less than the voltage value, and wherein the main converter is disabled if the voltage level of the power converter is greater than or equal to the voltage value.

2. The information handling system according to claim 1, wherein the circuit comprises a voltage comparator and voltage reference.

3. The information handling system according to claim 1, further comprising a capacitor coupled to the main and auxiliary converter outputs.

4. The information handling system according to claim 1, wherein said power converter has a power connector adapted to interface with a mating power connector of the information handling equipment.

5. The information handling system according to claim 1, wherein the said power converter is housed in a separate enclosure from said information handling equipment.

6. The information handling system according to claim 1, wherein the information handling equipment has a low power mode.

7. The information handling system according to claim 6, wherein the at least one system low power mode is selected from the group consisting of Advanced Configuration and Power Interface (ACPI) specification S4 and S5 states.

8. The information handling system according to claim 1, wherein said information handling equipment is selected from the group consisting of computer, personal computer workstation, portable computer, computer server, print server, network router, network hub, network switch, storage area network disk array, RAID disk system and telecommunications switch.

9. A power converter for supplying power to information handling equipment, comprising:
    a main converter;
    an auxiliary converter, wherein the main converter and the auxiliary converter have outputs coupled together with blocking diodes; and
    a circuit for enabling and disabling said main converter depending upon power drawn therefrom, wherein the circuit determines whether an output voltage level of the power converter is greater than, equal to, or less than a voltage value, wherein when the main converter is enabled if the output voltage level of the power converter is less than the voltage value, and wherein the main converter is disabled if the voltage level of the power converter is greater than or equal to the voltage value.

10. The power converter according to claim 9, wherein the circuit comprises a voltage comparator and voltage reference.

11. The power converter according to claim 9, further comprising a capacitor coupled to the main and auxiliary converter outputs.

12. A power converter for supplying power to information handling equipment, comprising:
    a plurality of converters, wherein the converters in the plurality of converters have outputs coupled together with blocking diodes; and
    a circuit for enabling and disabling the plurality of converters depending upon power drawn therefrom, wherein the circuit determines whether an output voltage level of the plurality of converters is greater than, equal to, or less than a voltage value, wherein when the main converter is enabled if the output voltage level of the plurality of converters is less than the voltage value, and wherein the main converter is disabled if the voltage level of the plurality of converters is greater than or equal to the voltage value.

13. A method for saving energy in an information handling system, said method comprising the steps of:
    supplying power to information handling equipment with a power converter comprising a main converter and an auxiliary converter, wherein the main converter and the auxiliary converter have outputs coupled together with blocking diodes; and
    enabling and disabling the main converter depending upon how much power is being drawn by the information handling equipment, wherein the enabling and disabling of the main converter is made on the basis of a determination of whether an output voltage level of the power converter is greater than, equal to, or less than a voltage value, wherein when the main converter is enabled if the output voltage level of the power converter is less than the voltage value, and wherein the main converter is disabled if the voltage level of the power converter is greater than or equal to the voltage value.

14. A method for supplying power to information handling equipment, comprising:
supplying power to information handling equipment with a power converter comprising a plurality of converters, wherein the converters in the plurality of converters have outputs coupled together with blocking diodes; and
enabling and disabling selected ones of the plurality of converters depending upon power drawn from the power converter by the information handling equipment, wherein the circuit determines whether an output voltage level of the plurality of converters is greater than, equal to, or less than a voltage value, wherein when the main converter is enabled if the output voltage level of the plurality of converters is less than the voltage value, and wherein the main converter is disabled if the voltage level of the plurality of converters is greater than or equal to the voltage value.

* * * * *